UNITED STATES PATENT OFFICE.

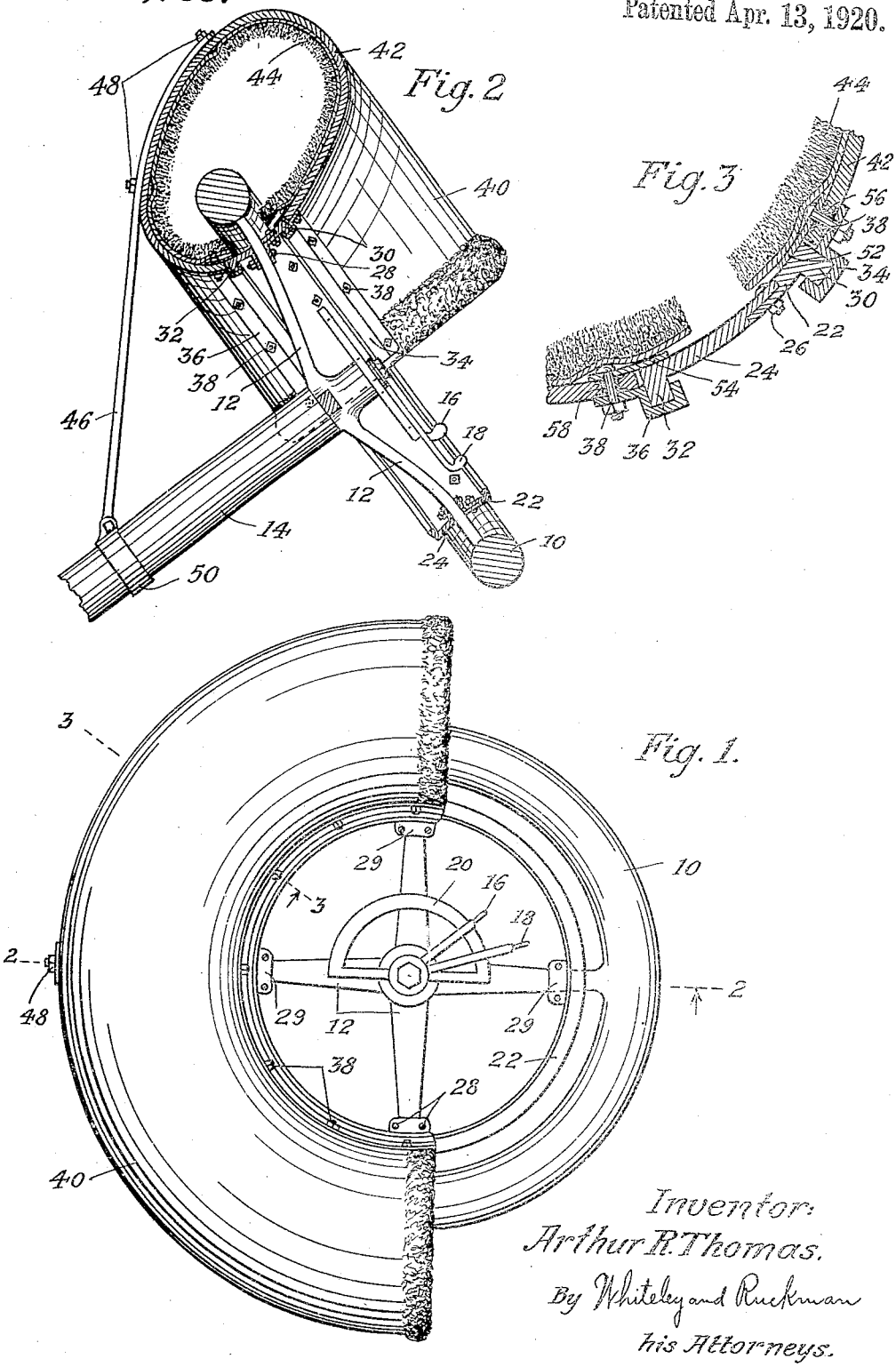

ARTHUR R. THOMAS, OF MINNEAPOLIS, MINNESOTA.

AUTOMOBILE-MUFF.

1,336,763.

Specification of Letters Patent.

Patented Apr. 13, 1920.

Application filed June 14, 1919. Serial No. 304,304.

*To all whom it may concern:*

Be it known that I, ARTHUR R. THOMAS, a citizen of the United States, residing at Minneapolis, in the county of Hennepin and State of Minnesota, have invented certain new and useful Improvements in Automobile-Muffs, of which the following is a specification.

My invention relates to automobile muffs and an object is to provide a device of this character which will keep the hands of the driver of the automobile warm in cold weather without the necessity of wearing gloves or mittens. Another object of my invention is to provide a device of this kind which may be readily attached to the steering wheels of various automobiles.

The full objects and advantages of my invention will appear in connection with the detailed description thereof and the novel features embodied in my inventive idea will be particularly pointed out in the claims.

In the accompanying drawings, which illustrate the application of my invention in one form,—

Figure 1 is a top plan view. Fig. 2 is a view in section on the line 2—2 of Fig. 1. Fig. 3 is a detail sectional view on an enlarged scale substantially on the line 3—3 of Fig. 1.

Referring to the drawings, 10 designates the rim of a customary steering wheel connected by spider arms 12 to a shaft mounted in a steering post 14. The spark control lever 16 and the throttle control lever 18 are movable over the sector 20 in the usual manner. The parts thus far referred to are of the usual construction and may vary according to the particular make of automobile. Two track-engaging members 22 and 24 are secured together by bolts 26 and are secured to the spider arms by bolts 28 passing through flanges 29, and the said members extend all the way around within and concentric with the rim 10. The track-engaging members are provided with guiding flanges 30 and 32, which are adapted to slide within recesses formed in supporting track members 34 and 36 secured by bolts or rivets 38 to a muff 40. The muff consists of a tubular outer member 42 of leather or other flexible durable material within which is a lining 44 of fur or similar warm material secured to the outer member or casing in any suitable manner, as by cementing. The muff is held in fixed position extending around the forward portion of the steering wheel rim by means of an arm 46, the upper end of which is secured to the muff by bolts or rivets 48 and the lower end of which is secured to the steering post by a clamp 50. The muff is constructed to extend around and inclose the steering wheel rim, preferably for a little more than half the periphery thereof, as shown in Fig. 1, and since it is held in position by the means just described, the front portion of the rim of the steering wheel is always inclosed by the muff regardless of the position to which the steering wheel is turned. The flanges 30 and 32 of the track-engaging members slide readily within the recesses of the track members 34 and 36 and the latter members may be retained in position upon the track-engaging members by strips 52 and 54 held in place by the bolts 38 which extend through eyelets 56 and 58 with which the casing 42 is preferably provided. Although it is necessary to leave a small segmental opening in the casing 42 for the passage of the arms 12 of the spider, the construction of the track is such as to make a tight joint and prevent the entrance of cold air into the muff at all places around its periphery.

The operation and advantages of my invention will be obvious from the foregoing description. The driver of the automobile thrusts his hands into the open rear ends of the muff and when turning the wheel for steering purposes his hands may be readily kept within the muff, since it is customary to slide the hands around the rim while turning the steering wheel. By the use of my muff the driver is enabled to keep his hands warm in the winter time without gloves, and is able to steer the automobile better since he can get a much firmer grip on the steering wheel rim with bare hands. At the same time his hands are fully protected from the cold, and also to better advantage since his fingers are not separated by the fingers of the glove ordinarily worn. The device may be readily installed in place on the steering wheel since it may be assembled prior to installation except that the bolts 26 and 28 must be removed and then replaced after the device is in position, in order to secure the track-engaging members together and to secure them to the arms 12.

I claim:

1. An automobile muff comprising a tubular member adapted to inclose the forward portion of the steering wheel rim, and means for mounting said tubular member to prevent turning with the steering wheel.

2. An automobile muff comprising a tubular member adapted to inclose the forward portion of the steering wheel rim, and means for attaching said tubular member to the steering post to prevent turning with the steering wheel.

3. An automobile muff comprising a tubular member adapted to inclose the forward portion of the steering wheel rim, a track-engaging member adapted to be secured to the steering wheel, and track members secured to said tubular members for coöperation with said track-engaging member.

4. An automobile muff comprising a tubular member adapted to inclose the forward portion of the steering wheel rim, a track-engaging member adapted to be secured to the steering wheel, track members secured to said tubular member for coöperation with said track-engaging member, and an arm secured to said tubular member adapted to be clamped to the steering post.

5. An automobile muff comprising a tubular member adapted to inclose the forward portion of the steering wheel rim, a track-engaging member adapted to be secured to the spider arms of the steering wheel so as to extend concentrically within the rim of the steering wheel, track members secured to said tubular member for coöperation with said track-engaging member, and means for clamping said tubular member in fixed position.

In testimony whereof I hereunto affix my signature.

ARTHUR R. THOMAS.